United States Patent [19]

Goel

[11] Patent Number: 4,683,282
[45] Date of Patent: Jul. 28, 1987

[54] NOVEL BORON TRIFLUORIDE-POLY (ALKYLENE OXIDE) AMINE CATALYSTS FOR CURING EPOXY RESINS

[75] Inventor: Anil B. Goel, Worthington, Ohio

[73] Assignee: Ashland Oil, Inc., Ashland, Ky.

[21] Appl. No.: 899,120

[22] Filed: Aug. 21, 1986

[51] Int. Cl.$^4$ ............................................. C08G 59/72
[52] U.S. Cl. ..................................... 528/91; 528/361; 528/408
[58] Field of Search ......................... 528/91, 361, 408

[56] References Cited

U.S. PATENT DOCUMENTS

| | | | |
|---|---|---|---|
| 2,839,495 | 6/1958 | Carey | 528/91 |
| 3,004,952 | 10/1961 | Brueschweiler et al. | 528/91 |
| 3,395,121 | 7/1968 | Pfann et al. | 528/91 |
| 4,436,880 | 3/1984 | Irving | 528/91 X |

*Primary Examiner*—Earl Nielsen
*Attorney, Agent, or Firm*—John F. Jones

[57] ABSTRACT

A process for curing epoxide resins by mixing an epoxide resin with a boron trifluoride-amine complex catalyst wherein the amine moiety of the catalyst is a poly(alkylene oxide) poly amine and heating the resulting mixture at a temperature in the range of from about 100° C. to about 200° C. is described.

12 Claims, No Drawings

NOVEL BORON TRIFLUORIDE-POLY (ALKYLENE OXIDE) AMINE CATALYSTS FOR CURING EPOXY RESINS

This invention relates to the use of certain boron trifluoride-amine catalysts in the curing of epoxide resins and more particularly pertains to the use of certain liquid boron trifluoride-amine catalysts for curing polyepoxide resins wherein the amine moiety of said catalyst is a poly(alkylene oxide) poly amine and more preferably a poly(alkylene oxide) di- or triprimary amine and poly(alkylene oxide) di- or trisecondary amine having a molecular weight falling in the range of from about 200 to about 10,000 and to the process for curing polyepoxide resins at a rapid rate in the presence of said catalysts.

Boron trifluoride-amine catalysts in which the amine moiety of the catalyst is a monofunctional primary or secondary aliphatic or aromatic amine have been used to cure epoxy resins (U.S. Pat. No. 2,717,285, for instance and also see C. A. May and Y. Tamaka, "Epoxy Resins Chemistry and Technology", Marcel Dekker Inc., N.Y. 1973, p. 293), as a latent catalyst. When these prior art catalysts are used to cure the epoxy resins, they generally give rather stiff, brittle polymers. Furthermore, most of the prior art boron trifluoride-amine catalysts are solids, and therefore, blending them with epoxy resins or other amines is somewhat inconvenient. The novel boron trifluoride-amine catalysts of this invention obtained by complexing boron trifluoride with poly(alkylene oxide) di- or triprimary amines are liquid, easily processible catalysts which cure epoxy resins to give tough and flexible polymers useful in applications such as adhesives, coatings and the like where polymer flexibility is an important desired property.

Poly(alkylene oxide) polyamines are prepared by amination of the hydroxyl groups of poly(alkylene oxide) polyols with ammonia or an amine, preferably ammonia or a primary amine.

I have discovered that epoxide resins which are cured using the catalysts of this invention can be made at accelerated rates and that the cured products are flexible, i.e. having shore d hardness of less than 70. The curing of epoxy resins with the catalysts of this invention may often be enhanced by the inclusion of small amounts of free amines or of isocyanates in the cure system if so desired.

In the prior art there are mentioned many cationic compounds including the halides of tin, aluminum, zinc, boron, silicon, antimony as well as the fluoroborates of many of these metals for use as epoxy resin curing catalysts. One of the most important members of this class, in terms of commercial use appears to be boron trifluoride. Boron trifluoride, per se, is not commonly used because it is too difficult to handle and causes rapid gelation of the epoxide resin with excessive exotherms when it is added directly to the epoxide resin. Boron trifluoride is usually used as a complex such as a boron trifluoride-amine complex wherein the amine is an aliphatic or an aromatic amine. The prior art boron trifluoride-amine complexes useful in epoxy curing are those of primary and secondary mono-amine complexes; however, these catalysts generally produce cured epoxy polymers which are very stiff and brittle. Furthermore, because most of the known boron trifluoride-amine catalysts are solids, their use in the curing of epoxide resins is somewhat inconvenient from a processing point of view.

There is a need for an epoxy resin curing catalyst which is convenient to handle and can be used easily in a long shelf life, one-component system by mixing with the epoxy resin system in advance of use, or in a two-component system (an epoxide resin component and a catalyst component) and in which these components optionally can be mixed with other epoxy-curing agents such as amines, amido-amines, phenolics and the like to produce, when cured, tough and flexible polymers which can be used in applications such as adhesives, coatings and the like where flexibility of the final thermoset polymer is an important feature.

I have discovered boron trifluoride-amine complex catalysts which are liquids and are easily processible with epoxy resins in either one- or two-component systems. These boron trifluoride-amine catalysts wherein the amine moiety is a poly(alkylene oxide) di- or tri-primary amine, may be prepared either by the complexation of boron trifluoride with a poly(alkylene oxide) di- or tri-primary amine, in equivalent ratio of about 1:1 or by a ligand substitution reaction of a boron trifluoride ligand (where the ligand is a weakly coordinated molecule such as diethyl ether, tetrahydrofuran and the like) with poly(alkylene oxide) di-or tri-primary amines. The poly(alkylene oxide) di- or tri-primary amines are obtainable by the amination reaction of a poly(alkylene oxide) diol or triol with ammonia and may be in the molecular weight range of from about 200 to about 10,000. The boron trifluoride-amine catalysts of this invention have been found to be readily miscible with most commonly available epoxy resins, and the resulting solutions formed show long room temperature shelf life without the gelation of the resin occurring. However, the catalysts of this invention cure epoxide resins at moderately elevated temperatures (about 100 to 200 degrees C., and preferably, 130 to 190 degrees C.) to give flexible thermoset polymers. The curing process of this invention has been found to be accelerated by the addition to the cure system of small amounts of commonly known epoxy curing agents such as amines, amido-amines, phenolics, dicarboxylic acid anhydrides and the like. Furthermore, the catalysts of this invention have been found to cure epoxy resins extremely fast in the presence of small amounts of mono- and polyisocyanates yielding flexible polymeric compositions.

The epoxide resins or polyepoxides useful in this invention can be monomeric or polymeric, saturated or unsaturated, aliphatic, cycloaliphatic, aromatic or heterocyclic, and they may be substituted if desired with other substituents besides the epoxy groups, e.g., hydroxyl groups, ether radicals, halogen atoms, and the like.

Typical epoxy components suitable in the practice of this invention include those disclosed in U.S. Pat. Nos. 2,500,600 and 2,324,483 which are incorporated herein by reference. Preferred in this invention are 1,2-epoxy compounds having an epoxide equivalence greater than 1, that is to say, compounds containing more than one group of the formula:

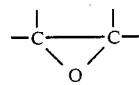

The 1,2-epoxide groups may be either terminal or inner ones. Particularly suitable terminal 1,2-epoxide groups are 1,2-epoxy ethyl or 1,2-epoxy propyl groups. The latter may be linked to an oxygen atom, that is to say, they are glycidyl ether or glycidyl ester groups. Compounds with inner epoxide groups usually contain the 1,2-epoxide group in an aliphatic chain or in a cycloaliphatic ring.

As epoxy compounds containing an inner 1,2-epoxy group there are suitable epoxidized diolefins, dienes, or cyclic dienes, such as 1,2,5,6-diepoxy hexane, 1,2,4,5-diepoxy cyclohexane, dicyclopentadiene diepoxide, dipentene diepoxide, vinyl cyclohexene diepoxide, epoxidized diolefinically unsaturated carboxylic acid esters, such as methyl 9,10,12,13-diepoxy stearate or the dimethyl ester of 6,7,10,11-diepoxyhexadecane-1,16-dicarboxylic acid. Furthermore, there may be mentioned epoxidized mono-, di-, or polyesters or mono-, di-, or polyacetals containing at least one cycloaliphatic 5-membered or 6-membered ring, to which at least two 1,2-epoxidized groups are linked.

A widely used class of polyepoxides which can be used in the present invention are the epoxy polyethers obtained by reacting a halogen containing epoxide or dihalohydrin, such as epichlorohydrin, epibromohydrin, 3-chloro-1,2-epoxyoctane, and the like with either a polyhydric phenol or a polyhydric alcohol.

In the process of this invention the catalyzed epoxide resin compositions before curing may be filled with fillers such as talc, silica, metal oxides, metal powders, carbon and the like as well as pigments, surfactants, and other additives and modifiers known to those skilled in the art in the cure of epoxy resins. The cured compositions of this invention may be used in applications such as adhesives, coatings, reaction injection molding (RIM), reinforced composites, and the like.

This invention is further illustrated in the following representative examples.

EXAMPLE 1

To 100 g of poly(propylene oxide) diprimary amine prepared by the amination of poly(propylene oxide) diol with ammonia (molecular weight of 2000 from Texaco Chemical Company) was added dropwise under continuous stirring 14 g of boron trifluoride-diethyl ether complex. An exothermic reaction occurred and the reaction temperature was maintained at or near room temperature. The reaction solution was stirred at room temperature for about an hour after the addition was complete and the diethyl ether was then stripped off under reduced pressure on a rotary evaporator. The resulting viscous liquid had a viscosity at about 24 degrees C. of 12,000 cps. The viscous liquid product after two months at room temperature showed a viscosity of 12,200 cps indicating the stability of this novel boron trifluoride-poly(propylene oxide) diamine complex.

EXAMPLE 2

The procedure of Example 1 was followed using 100 g of a poly(propylene oxide) diprimary amine (molecular weight of 4000) and 7 g of boron trifluoride-diethyl ether complex. The resulting viscous liquid, after vacuum stripping of the diethyl ether had a room temperature viscosity of 9,700 cps. The viscosity of this complex after it had been stored at room temperature for two months was found to be 9,750 cps indicating excellent shelf stability.

EXAMPLE 3

The procedure of Example 1 was followed using 100 g of poly(propylene oxide) triprimary amine prepared by amination of poly(propylene oxide) triol with ammonia (molecular weight of 3100) and 14 g of boron trifluoride-diethyl ether complex. After stripping off the diethyl ether, a highly viscous liquid complex was obtained. The initial viscosity of the complex was 28,500 cps at room temperature and after storage at room temperature for two months the viscosity was 29,500 cps.

EXAMPLE 4

The procedure of Example 1 was followed using 20 g of poly(propylene oxide) diprimary amine (molecular weight 400) and 14 g of boron trifluoride-diethyl ether complex. After stripping off the diethyl ether a highly viscous liquid complex was obtained.

EXAMPLE 5

A solution of 83 parts by weight of liquid diglycidyl ether of Bisphenol-A (LDGEBPA) (epoxy equivalent weight of 185–195) and 17 parts of the boron trifluoride-poly(propylene oxide) diprimary amine complex of Example 1 was prepared. A part of this solution was kept at room temperature for aging studies and another portion (15 g) was cured at 140 degrees C. The cured solution gelled in about 45 minutes at 140 degrees C. to give an infusible product which after postcuring at about 150 degrees C. for 30 minutes gave a thermoset polymer having a shore hardness D of 50.

The viscosity of the room temperature stored solution was measured periodically and was found to be 8,800 cps initially, 11,300 cps after one week, 14,000 cps after two weeks, 16,500 cps after four weeks, and 20,500 cps after seven weeks indicating good shelf stability. This experiment suggests that the mixture of diepoxide resin and the catalyst of this invention can be used as a one-component system having reasonably good room temperature stability and still will cure at elevated temperatures to give a flexible thermoset polymer.

EXAMPLE 6

This example is for comparative purposes and is outside the scope of the present invention. Liquid diglycidyl ether of Bisphenol-A (epoxy equivalent weight of 185–195) containing 5 weight percent of boron trifluoride-diethyl amine complex catalyst was heated at 140° C. for 40 minutes to give a rigid thermoset polymer which had a shore D hardness of 87 which is much higher than that for the polymer of Example 5.

EXAMPLE 7

A solution of 18 g of a rubber modified epoxy resin obtained by reacting the liquid diglycidyl ether of Bisphenol-A (epoxy equivalent weight of 180–190) with 10% by weight of a carboxylic acid terminated butadiene/acrylonitrile (18% by weight of acrylonitrile) copolymer (CTBN 1300×8 Hycar rubber from B F Goodrich Co.) and 15 g of boron trifluoride-poly(propylene oxide) diamine catalyst of Example 1 was prepared and divided into two parts. One part was kept at room temperature to determine the room temperature shelf stability and was found to remain in liquid form even after a three week period of standing. The other part was heated at 145° C. and gelation occurred in about 35 minutes. The resulting polymer was postcured at 150° for 30 minutes and the resulting thermoset polymer was found to be flexible with a shore D hardness of 48.

EXAMPLE 8

A solution of rubber modified epoxy resin of Example 7 (6.5 g), the complex of Example 1 (5 g) and poly(propylene oxide) triprimary amine (molecular weight of about 400) (1 g) was heated at 130° C. and gelation occurred within 2.5 minutes to give an infusible product. The product was postcured at 150° C. for 30 minutes and the shore D hardness was found to be 40. This experiment indicates that epoxide resins can be cured rapidly using a mixture of the complex of this invention and a poly(propylene oxide) polyamine to give flexible thermoset polymers.

EXAMPLE 9

The epoxy solution of Example 5 containing the boron trifluoride-amine complex catalyst (10 g) was mixed with 2 g of poly(propylene oxide) diprimary amine (molecular weight of 400) and the mixture was heated at 110° C. Gelation occurred in about 3 minutes to give a flexible thermoset polymer product.

EXAMPLE 10

A solution of 10 g of the liquid diglycidyl ether of Bisphenol-A (epoxy equivalent weight of 180-190), 2.5 g of the $BF_3$-amine complex of Example 1 and 7.5 g of poly(propylene oxide) di-primary amine (Molecular weight of 2000) was prepared. A part of this (10 g) was kept at room temperature to determine the open time. This portion of the mixture remained ungelled, even after 18 hours at room temperature. The remaining portion of the mixture was heated at 110° C. and gelation occurred in about 3 minutes.

EXAMPLE 11

A solution of 15 g of the epoxy resin of Example 10 and 3 g of the boron trifluoride-amine catalyst of Example 4 was divided into three equal parts. The first part was heated at 140° C. and gelation occurred in about 30 minutes. The second part was mixed with 1 g of poly(propylene oxide) diprimary amine (molecular weight of 400) and heated at 116° C. and gelation occurred in about 2.6 minutes. The third part was mixed with 0.4 g of toluene diisocyanate and was heated at 116° C. An extremely exothermic reaction occurred and the mixture gelled in about 1.5 minutes. These experiments clearly demonstrate that the catalysts of this invention can be used as a catalyst to polymerize epoxy resins either alone or at a much faster rate in the presence of other amines or at an extremely fast rate in the presence of isocyanates to give flexible thermoset polymers.

EXAMPLE 12

A mixture of 6 g of liquid diglycidyl ether of Bisphenol-A (epoxy equivalent weight of 180-190), 6 g of the $BF_3$-amine complex catalyst of Example 2 and 0.6 g of liquid methylene bis(phenyl isocyanate) was heated at 115° C. Gelation occurred in about 7 minutes to give a thermoset polymer which was postcured at 130° C. for 30 minutes. The shore D hardness for the product was found to be 62.

EXAMPLE 13

A mixture of 6 g of the rubber modified epoxy resin of Example 7, 5 g of the $BF_3$-amine complex catalyst of Example 3 and 0.5 g of toluene diisocyanate was heated at 115° C. Gelation occurred with 5 minutes to give a flexible thermoset polymer, which upon postcuring at 130° C. for 30 minutes showed a shore D hardness of 60.

EXAMPLE 14

An epoxy resin hardener composition was prepared by blending 34 parts by weight of poly(propylene oxide) tri-primary amine (molecular weight of 3100), 5 parts by weight of poly(propylene oxide) di-primary amine (molecular weight 400), 12.5 parts of Bisphenol-A, 4 parts of tris(dimethylaminomethyl) phenol, 10 parts of the boron trifluoride-amine complex of Example 12 and 35 parts of talc filler. This hardener was mixed with an epoxy resin prepared by blending 59.5 parts by weight of liquid diglycidyl ether of Bisphenol-A, 6.6 parts by weight of a carboxylic acid terminated polybutadiene/acrylonitrile rubber, 30 parts by weight of talc, 1.4 parts of fumed silica and 2 parts of tetramethyl xylyl diisocyanate in 1:1.5 weight ratio (hardener to epoxy resin). The thixotropic adhesive was applied between two 10 inches by 4 inches by 100 mils fiberglass reinforced polyester panels (sheet molding compound or SMC) with one inch wide overlap between the panels and the structure was cured in a heated fixture at 230° F. for 4 minutes, followed by postcuring at 300° F. for 30 minutes. One inch wide adhesive test samples were cut and tested in lap shear mode which showed 100% fiber tear of the substrate with lap shear strengths ranging between 350 and 700 psi.

EXAMPLE 15

A solution of the liquid diglycidyl ether of Bisphenol-A (epoxy equivalent weight of 190) which has reacted with 10% by weight of the carboxylic acid terminated butadiene/acrylonitrile rubber (18% acrylonitrile in the rubber), 1.2 g of a boron trifluoride-amine complex wherein the amine was poly (propylene oxide) diamine (molecular weight about 2000) and 0.3 g of toluene diisocyanate was prepared and was used to make a 1 mil thick coating on an unprimed aluminum sheet. This coating was cured at 130° C. for 20 minutes and was then tested for adhesion (ASTM D-3359) showing 100% adhesion and no failure was observed with 80 inch pounds of reverse impact (ASTM D-2794) showing that the film had excellent impact resistance as well as excellent adhesion to the substrate.

EXAMPLE 16

This is a comparative example and is outside the scope of this invention. The use of a conventional boron trifluoride-amine complex in the curing of epoxy resins was shown by preparing a solution of 4 g of the epoxy resin described in Example 15, 1.0 g of the diglycidyl ether of poly(propylene glycol) epoxy (equivalent weight of 320), 0.25 g of boron trifluroride-ethyl amine catalyst and 0.3 g of toluene diisocyanate. This solution was applied as a 1 mil thick coating on an unprimed aluminum sheet as was done in Example 15. The coating was cured at 130° C. for 20 minutes and was then tested for adhesion which showed over 90% adhesion failure. The F pencil hardness coating showed failure and reverse impact showed brittle failure even at less than 40 inch pounds.

EXAMPLE 17

Two epoxy resins were allowed to react with various boron trifluoride-amine complexes of this invention at 160° C. and the gel time (time for formation of an infusible polymer product) was determined in each case. The materials used and results obtained are given in the following table.

TABLE

| Sample No. | Epoxy Resin (g) | BF$_3$-Amine (g) | Gel Time (min.) |
|---|---|---|---|
| | LDGEBPA* | | |
| 1 | 9 | A (1) | 14 |
| 2 | 8 | B (2) | 16 |
| 3 | 8 | C (2) | 9 |
| 4 | 6 | D (4) | 9 |
| | DGEPPG** | | |
| 5 | 9 | A (1) | 10 |
| 6 | 8 | B (2) | 13 |
| 7 | 8 | C (2) | 7 |
| 8 | 6 | D (4) | 13 |

*LDGEBPA - Liquid Diglycidyl ether of Bisphenol-A (Epoxy equivalent weight 185).
**DGEPPG - Diglycidyl ether of poly (propylene oxide) glycol (epoxy equivalent weight of 190).
A - BF$_3$-Amine of Example 4
B - BF$_3$-Amine of Example 1
C - BF$_3$-Amine of Example 3
D - BF$_3$-Amine of Example 2

EXAMPLE 18

A solution of 5 g of the epoxy resin described in Example 15, 0.6 g of BF$_3$-amine complex wherein the amine is poly(propylene oxide) diamine (molecular weight 400) and 0.3 g of toluene diisocyanate was applied as a coating to the surface of a zinc phosphate treated cold rolled steel panel and the coating was cured at 230° F. for 15 minutes. The resulting highly glossy, transparent coating showed an ASTM pencil hardness of HB and 100% adhesion. The coating did not fail at 45 inch pounds reverse impact testing indicating excellent flexibility of the coating.

I claim:

1. A process for curing epoxide resins comprising mixing of epoxide resin with a boron trifluoride-amine complex catalyst wherein the amine moiety of said catalyst is a poly(alkylene oxide) polyamine and heating the resulting mixture at a temperature in the range of from about 100° to 200° C.

2. The process of claim 1 wherein the polyepoxide is a compound containing more than one group of the formula:

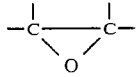

3. The process of claim 2 wherein the poly(alkylene oxide) poly amine is a member selected from the group consisting of a diprimary amine, a disecondary amine, a triprimary amine and a trisecondary amine and mixtures thereof.

4. The process of claim 3 wherein the poly(alkylene oxide) poly amine has a molecular weight in the range of from about 200 to about 10,000.

5. The process of claim 4 wherein the poly(alkylene oxide) poly amine is a poly(propylene oxide) diprimary amine.

6. The process of claim 4 wherein the poly(alkylene oxide) poly amine is poly(propylene oxide) triprimary amine.

7. The process of claim 4 wherein the epoxide resin is the diglycidyl ether of bisphenol-A.

8. The process of claim 4 wherein the epoxide resin is the diglycidyl ether of poly(propylene oxide) glycol.

9. The process of claim 5 wherein the epoxide resin is the diglycidyl ether of bisphenol-A.

10. The process of claim 6 wherein the epoxide resin is the diglycidyl ether of Bisphenol-A.

11. The process of claim 5 wherein the epoxide resin is the diglycidyl ether of poly(propylene oxide) glycol.

12. The process of claim 6 wherein the epoxide resin is the diglycidyl ether of poly(propylene oxide) glycol.

* * * * *